United States Patent [19]

Wakahara et al.

[11] Patent Number: 5,115,695
[45] Date of Patent: May 26, 1992

[54] HYDRAULIC CONTROL SYSTEM FOR AUTOMATIC TRANSMISSION

[75] Inventors: Tatsuo Wakahara, Kawasaki; Kazuyoshi Iwanaga; Shigeru Ishii, both of Atsugi, all of Japan

[73] Assignee: Nissan Motor Co., Ltd., Yokohama, Japan

[21] Appl. No.: 483,218

[22] Filed: Feb. 22, 1990

[30] Foreign Application Priority Data

Feb. 28, 1989 [JP] Japan .................... 1-48759

[51] Int. Cl.⁵ .................................. B60K 41/06
[52] U.S. Cl. .................................. 74/868; 74/867
[58] Field of Search ............... 74/866, 867, 868, 869; 364/424.1

[56] References Cited

U.S. PATENT DOCUMENTS

| 4,653,350 | 3/1987 | Downs et al. ........... 74/866 X |
| 4,653,351 | 3/1987 | Downs et al. ........... 74/869 X |
| 4,707,789 | 11/1987 | Downs et al. ........... 364/424.1 |
| 4,722,247 | 2/1988 | Shindo et al. ........... 74/866 |
| 4,724,723 | 2/1988 | Lockhart et al. ........... 74/854 |
| 4,730,521 | 3/1988 | Hayasaki et al. ........... 74/867 |
| 4,790,418 | 12/1988 | Brown et al. ........... 192/0.032 |
| 4,947,970 | 8/1990 | Miller et al. ........... 74/866 X |
| 4,949,595 | 8/1990 | Shimanaka ........... 74/867 X |
| 5,012,699 | 5/1991 | Aoki et al. ........... 74/869 |

Primary Examiner—Dwight Diehl
Attorney, Agent, or Firm—Foley & Lardner

[57] ABSTRACT

During minimal load or so called power off upshifts, the level of the line pressure which is applied during the inertia phase of a friction element which becomes engaged as a result of the upshift, is controlled in accordance with the rotational speed difference between parts of the friction element which are rotatable relative to one another.

5 Claims, 10 Drawing Sheets

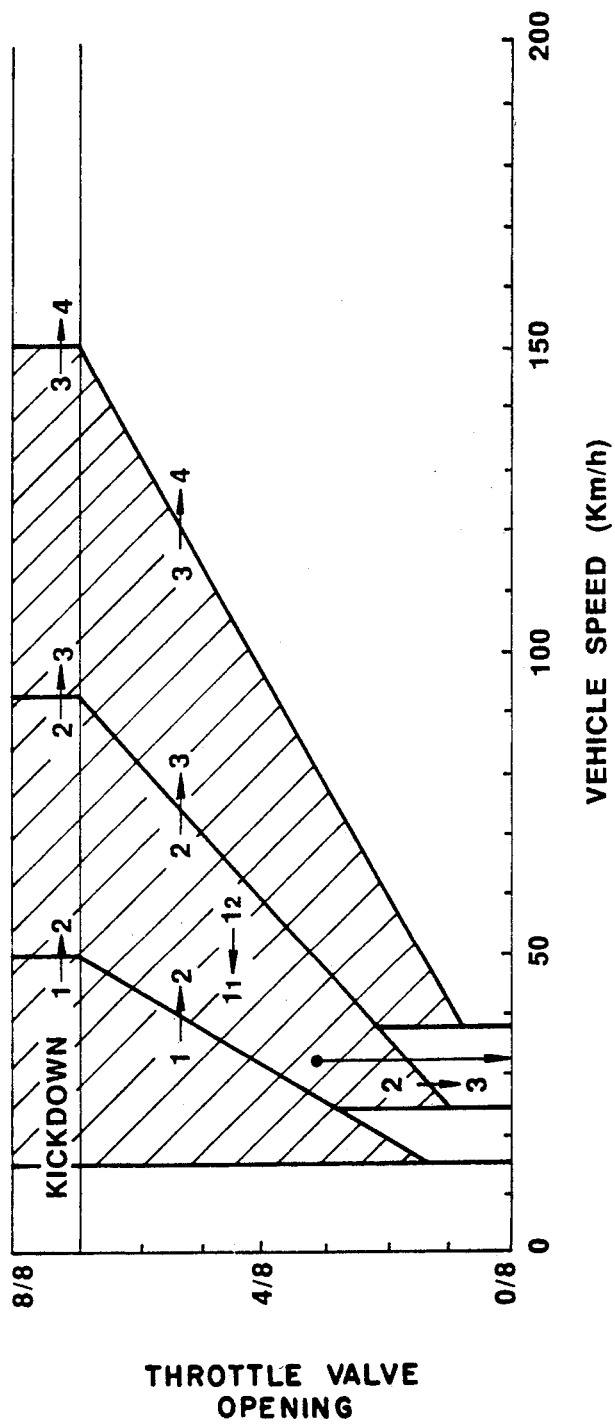

FIG.10

| GEAR RATIO / FRICTION ELEMENT | | R/C | H/C | F/C | B/B | L&R/B |
|---|---|---|---|---|---|---|
| REVERSE | | O | | | | O |
| FORWARD | 1ST | | | O | | |
| | 2ND | | | O | O | |
| | 3RD | | O | O | | |
| | 4TH | | O | O | O | |

FIG.11

| GEAR RATIO / SOL. | SOLENOID 1 | SOLENOID 2 |
|---|---|---|
| 1ST | ON | ON |
| 2ND | OFF | ON |
| 3RD | OFF | OFF |
| 4TH | ON | OFF |

HYDRAULIC CONTROL SYSTEM FOR AUTOMATIC TRANSMISSION

BACKGROUND OF THE INVENTION

1. Field of the Invention

The present invention relates generally to a automatic automotive transmission and more specifically to a line pressure control arrangement which adjusts the pressure level in accordance with the variation in the inertia phase during no load upshifting.

2. Description of the Prior Art

An automatic transmission Service Manual (publication A261C07) issued in March 1987 relating to the so called RE4RO1A type transmission, describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

In the above mentioned arrangement, because the line pressure is controlled by a single throttle valve position (engine load) — line pressure schedule, during shifting operations it has been found very difficult to successfully control the line pressure to just the right level for all of the various shift possibilities. For example, the line pressure level required during a power ON shift is greater than in the case of a corresponding power OFF shift made at the same speed. Further, if the shift occurs at a high vehicle speed the required level of line pressure is higher than in the case the same or similar shift occurs at low speeds even though the position of the throttle valve may be the same.

Accordingly, as shown in FIG. 9, with the above type of transmission, when the accelerator pedal is released and the engine throttle valve is allowed to close, the load on the engine suddenly drops, the level of the line pressure is lowered and the throttle valve opening/vehicle speed co. ordinate crosses the upshift line in the manner indicated by the arrow.

Under these conditions, when the vehicle speed is relatively high, the relative rotation between the driven and driving elements of the friction element or elements which are engaged in response to the upshifting, is relatively high and the line pressure produced in accordance with the instant throttle setting tends to be inadequate to induce the required amount of engagement. On the other hand, when the vehicle speed is low, the relative rotation between the driving and driven elements is small and shift shock tends to be induced as the pressure which is applied tends to be overly high for the instant set of operating conditions. Setting the pressure at a level suitable for one of course invites problems with the other.

SUMMARY OF THE INVENTION

It is an object of the present invention to provide an arrangement which can control the level of line pressure to appropriate levels during both power on and off shifting.

In brief, the above object is achieved by an arrangement wherein, during minimal load or so called power off upshifts, the level of the line pressure which is applied during the inertia phase of a friction element which becomes engaged as a result of the upshift, is controlled in accordance with the rotational speed difference between parts of the friction element which are rotatable relative to one another.

More specifically, a first aspect of the present invention is deemed to comprise an automatic transmission which features: a friction element which is engaged during an upshift; means for detecting a power off upshift; and line pressure control means for controlling the level of line pressure in accordance with the relative rotation which occurs between driven and driving elements of the friction element during the inertia phase of a power off upshift.

A second aspect of the invention is deemed to comprise a transmission which features: means for detecting the transmission undergoing an upshift under minimal load; means for detecting an inertia phase of a friction element which becomes engaged during the minimal load upshift; means for estimating the relative rotational speed which occurs between elements of the friction element which are rotatable relative one another; and means responsive to the detection of a minimal load upshift for adjusting the level of a hydraulic fluid pressure which is used to engage the friction element in accordance with the estimated relative rotational speed which occurs between elements of the friction element which are rotatable relative one another.

A third aspect of the present invention is deemed to comprise a method of controlling a transmission having a hydraulically operated friction element, the method featuring the steps of: detecting an inertia phase of a minimal load upshift; adjusting the level of a hydraulic fluid pressure which is used to engage the friction element during the inertia phase in accordance with the relative rotational speed which occurs between elements of the friction element.

A fourth aspect of the present invention is deemed to comprise an automotive power train which features: an engine having a throttle valve; a throttle valve sensor for sensing the position of the throttle valve and issuing a signal indicative of the load on the engine; a transmission operatively connected with the engine, the transmission including: a friction element, the friction element being engaged when the transmission upshifts from a first gear ratio to a second higher gear ratio; a line pressure control solenoid, and a vehicle speed sensor; a control unit for controlling the operation of the line pressure control solenoid, the control circuit being operatively connected with the throttle valve sensor and the vehicle speed sensor and including means for: detecting the transmission undergoing an upshift under minimal engine load; detecting the inertia phase the friction element; determining the rotational speed difference between elements of the friction element which are rotatable relative on one another; controlling the level of line pressure which is applied to the friction element during the inertia phase of the upshift in accordance with the determined rotational speed difference; and controlling the level of line pressure during the phases of the shift which precede and follow the inertia phase according to a predetermined schedule.

BRIEF DESCRIPTION OF THE DRAWINGS

FIG. 4 shows a shift schedule in accordance with which the transmission arrangement shown in FIGS. 2 and 3 is controlled;

FIG. 10 is a table showing the relationship between the friction element engagements and the gears of the transmission which are produced by the same; and FIG. 11 is a table showing the manner in which the two shift control solenoids are energized to induce first — fourth gear ratios.

DETAILED DESCRIPTION OF THE PREFERRED EMBODIMENTS

Figure 1:
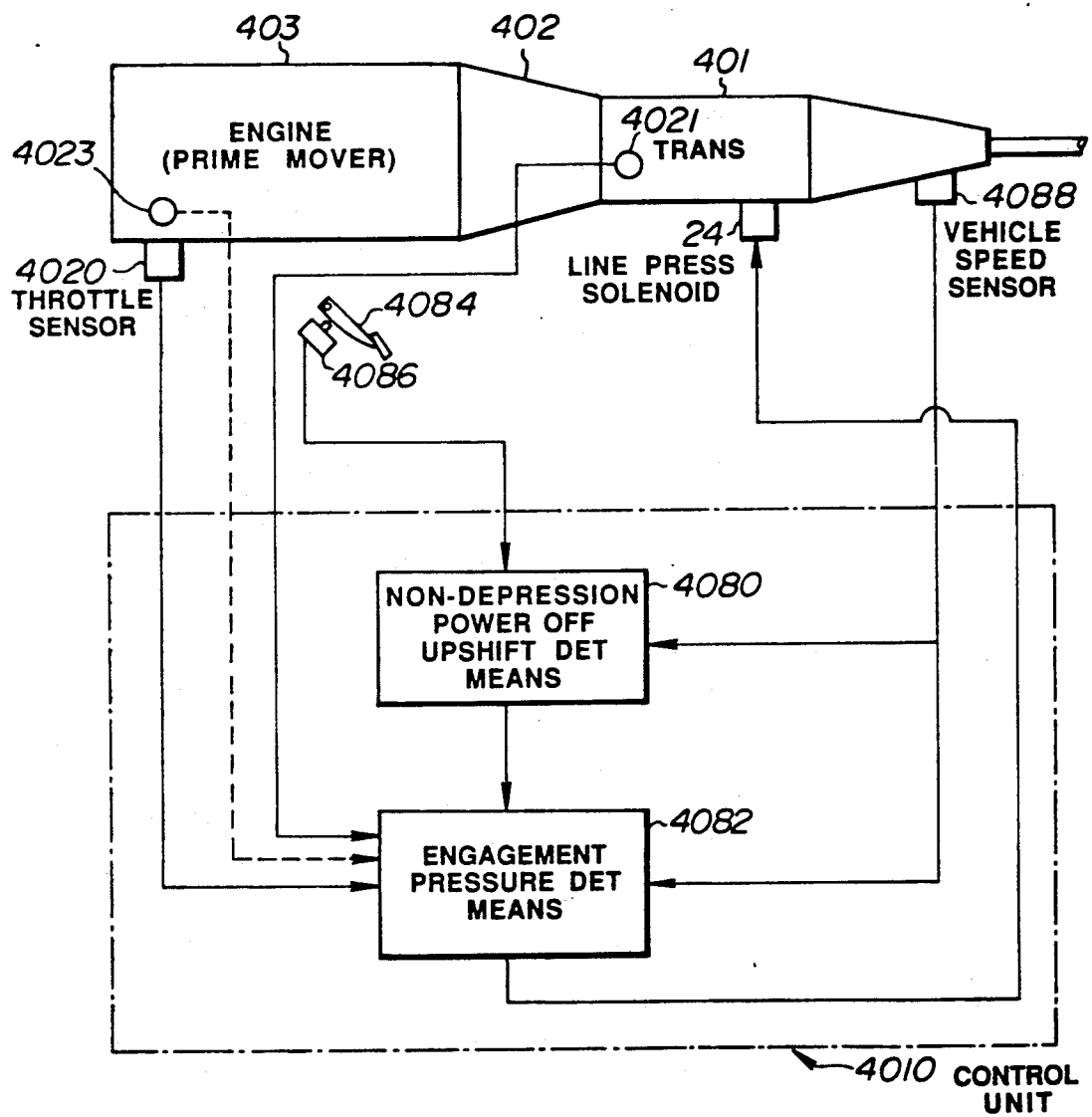
FIG. 1 is a schematic block diagram depicting engine and transmission system to which an embodiment of the present invention is applied.

FIG. 1 shows an engine/transmission power train to which an embodiment of the present invention is applied. This system includes an automatic transmission 401 which is operatively connected by way of torque converter 402 to prime mover (internal combustion engine) 403.

Figure 2:
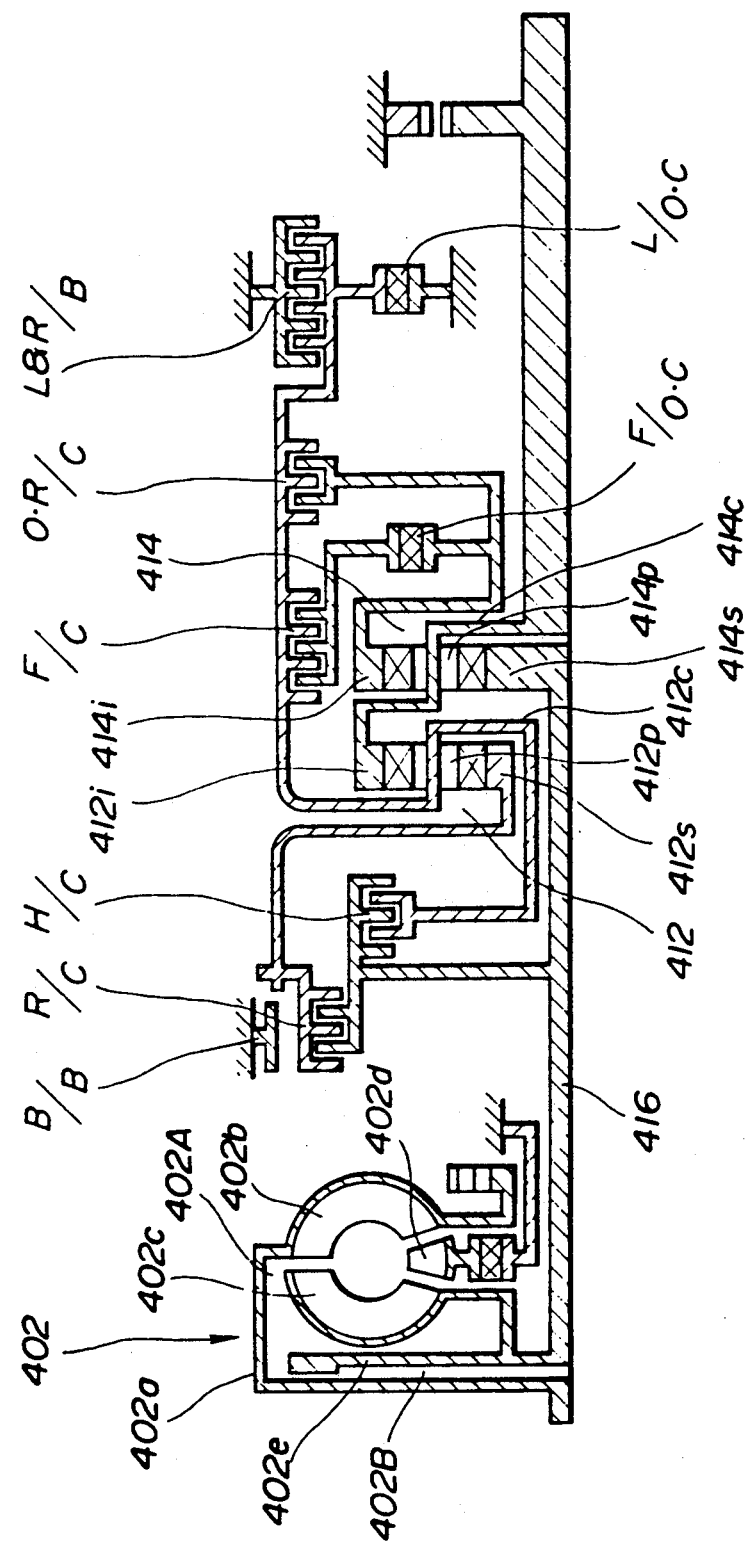
FIG. 2 shows the arrangement of the gear train of the transmission shown in FIG. 1.

The transmission in this instance comprises first and second planetary gear units 412 and 414 which are arranged in tandem. As shown in FIG. 2, the forward planetary gear 412 comprises a front sun gear 412s, front pinion gears 412p, a front internal or ring gear 412i and a pinion gear carrier 412c. The rear planetary gear similarly comprises a front sun gear 414s, front pinion gears 414p, a front internal or ring gear 414i and a pinion gear carrier 414c.

In this arrangement a transmission input shaft 416 is arranged to be selectively connectable with the front sun gear 412s by way of a reverse clutch R/C, and selectively connectable with the front planetary gear carrier 12c by way of a H/C. The front planetary gear carrier 412c is selectively connectable with the rear ring gear 14i by way of a forward clutch F/C; the front sun gear 412s is connectable with the transmission housing through a band brake B/B, the front carrier 412c is selectively connectable with the transmission housing through a low and reverse brake L&R/B.

In addition to this, a forward overrunning clutch F/O is arranged between the forward clutch F/C and the rear ring gear 414i; while a low overruning clutch L/O is arranged between front planetary gear carrier 412c and the transmission housing. An overrunning clutch O.R/C is to provide a selective connection between front planetary gear carrier 412c and the rear ring gear 414i and is arranged in parallel with the F/O.C.

By selectively supplying the above listed friction elements with line pressure in accordance with the table shown in FIG. 10, a plurality (4) forward speeds and one reverse gear ratio can be produced. In this table, the circles denote the friction elements which are supplied with the above mentioned line pressure.

It should be also noted that with the gear train illustrated in FIG. 2 the forward overruning clutch F/O.C is arranged such that when the front planetary gear 412c and the rear ring gear 414i are prevented from rotating in the opposite direction from one another.

It should also be noted that even though it is not shown in the table shown in FIG. 10, when the above mentioned overruning clutch O.R/C is engaged, the function of the forward overrunning clutch is negated and engine braking is rendered possible.

Figure 3A:
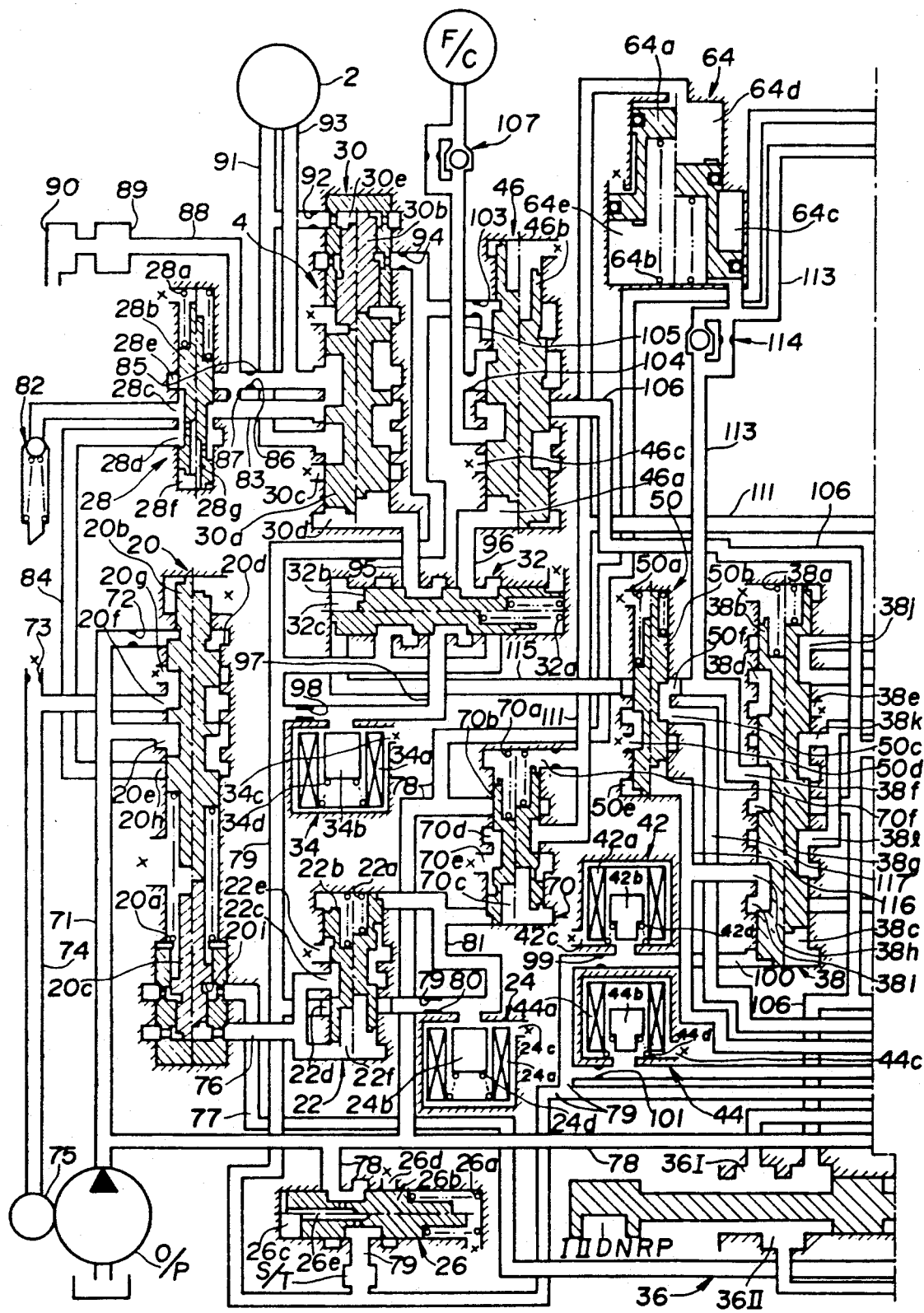
FIGS. 3A and 3B show a hydraulic control system which is associated with the gear train shown in FIG. 2.
Figure 3B:
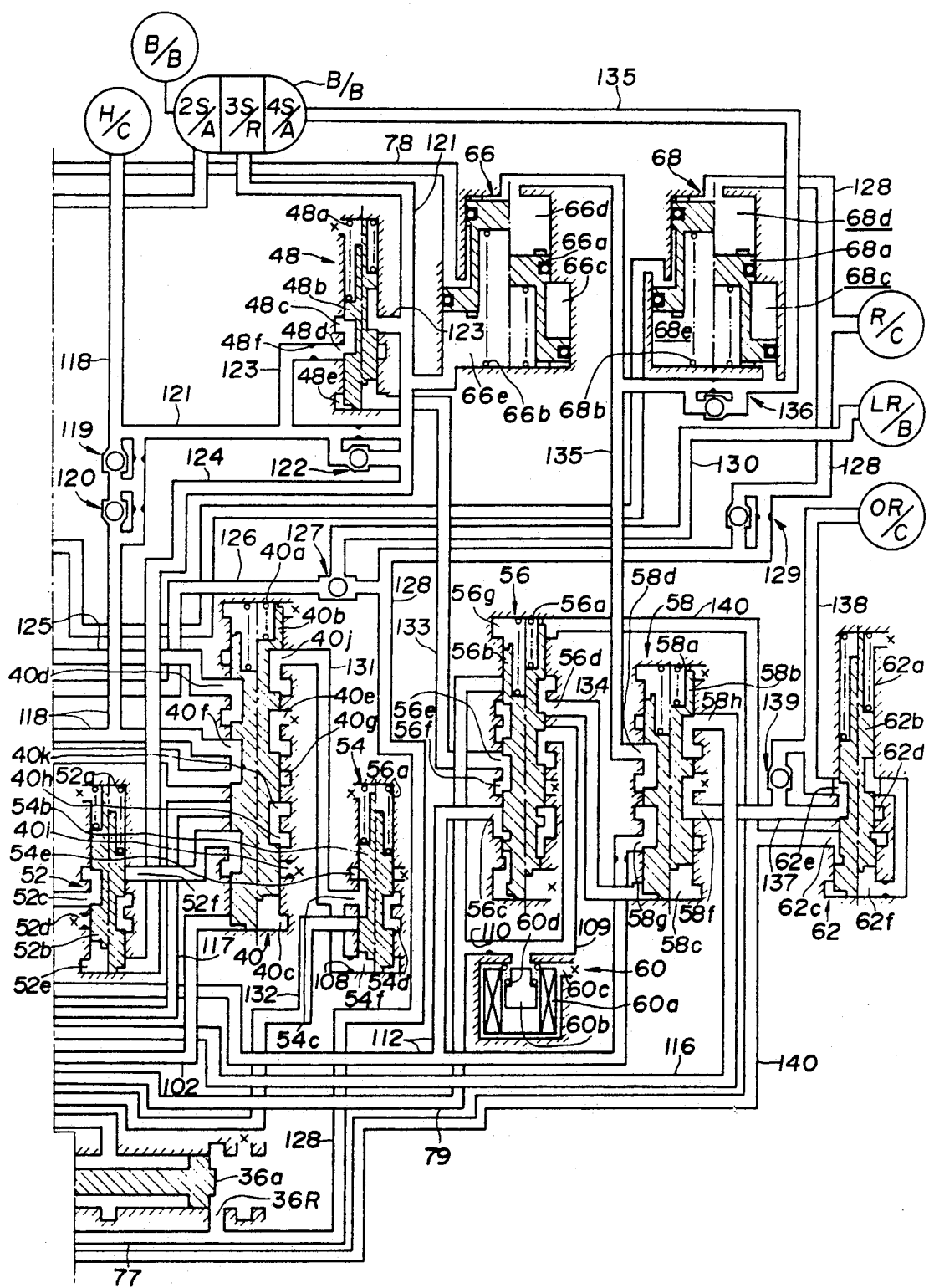

FIGS. 3A and 3B show a hydraulic control circuit by which the above mentioned friction elements are selectively engaged and disengaged. This circuit includes a pressure regulator valve 20, a pressure modifier valve 22, a line pressure solenoid 24, a pilot valve 26, a torque converter regulator valve 28, a lock-up control valve 30, a shuttle valve 32, a lock-up solenoid 34, a manual valve 36, a first shift valve 38, a second shift valve 40, a first shift solenoid 42, a second shift solenoid 44, a forward clutch control valve 46, a 3-2 timing valve 48, a 4-2 relay valve 50, a 4-2 sequence valve 52, a first range pressure reducing valve 54, a shuttle valve 56, a overrunning clutch control valve 58, a third shift solenoid 60, an overruning clutch pressure reducing valve 62, a second speed servo apply pressure accumulator 64, a third speed release pressure accumulator 66, a fourth speed servo apply pressure accumulator 68 and an accumulator control valve 70.

The above listed elements cooperate in a manner to control the supply of line pressure hydraulic fluid from the pressure modulator valve 22 to the reverse clutch R/C, high clutch H/C, the forward clutch F/C, band brake B/B, low and reverse brake L&R/B, the overrunning clutch O.R/C in response to the shifting of the first and second shift valves 38, 40.

It should be noted that the above described arrangement is disclosed in U.S. Pat. No. 4,730,521 which issued on Mar. 15, 1988 in the name of Hayasaki et al. The contents of this document is hereby incorporated by reference thereto.

It should be further noted that band brake servo BS which operates the band brake B/B includes a second speed servo apply chamber 2S/A, a third speed servo release chamber 3S/R and a fourth speed apply chamber 4S/A. When the second speed apply chamber 2S/R is supplied with line pressure the band brake is applied. However, when the third speed release chamber 3S/R is supplied with line pressure, even though the second speed apply chamber continues to be supplied with pressure, the band brake is released. Further, when the fourth speed apply chamber is pressurized, irrespective of the supply of pressure into the other two, the band brake is applied.

The shifting of the first and second shift valves 38, 40 is controlled by the first and second shift solenoids 42, 44, respectively. When these solenoids are energized, pilot pressure is supplied to the shift valves 38, 40 and the spool valve elements thereof assume the positions indicated by the right-hand half sections. On the other hand, when the solenoids are de-energized, the chambers into the pilot pressure is supplied, are drained and the spool valve elements assume the positions indicated by the left-hand half sections.

FIG. 11 shows in table form the relationship between the gear ratio which is produced and the ON/OFF energization statuses of the first and second shift solenoids 42, 44.

Referring back to FIG. 1, a control unit 4010 is arranged to output control signals to first and second shift solenoids 42, 44 in accordance with a shift schedule of the nature shown in FIG. 4. As will be noted, this schedule is defined in terms of throttle opening (engine load) and vehicle speed. Shifting between the forward gears of the transmission is controlled in accordance with the change in position of a throttle position/vehicle speed coordinate. The change in position can be induced by a change in one of or both of the above mentioned parameters.

When the accelerator pedal is released upshifting can take place in the hatched areas.

The oil pump O/P is driven by the engine and the output is regulated by the pressure regulator valve 20 to form the above mentioned line pressure. As shown in FIG. 3A the pressure regulator valve 20 includes a bore in which and upper and lower spool valve elements are reciprocatively disposed. The lower spool valve element is reciprocatively disposed in a plug which is fixed in the lower end of the bore. The bore is formed with a port 20d in which the output of the pump O/P is supplied. The pressure admitted into the valve bore through this port, acts on a pressure differential area in a manner to produce a bias which tends to move the upper spool downwardly (as seen in the drawings). On the other hand, a spring 20a is disposed between a plug 20c and the upper spool and arranged to produce a bias which tends to move the spool in question upwardly.

The modifier pressure which is produced by the pressure modifier valve 22 is selectively supplied to the pressure regulator valve 20 under the control of the line pressure solenoid 24. In this case the modifier pressure is supplied via conduit 76 to a chamber defined in the pressure regulator valve 20 between the plug 20c and the bottom of a second or lower spool. This pressure produces an upward bias which tends to move the lower spool up into engagement with the upper one. The resulting movement of the upper spool modulates the pump output and controls the pressure appearing at port 20e to line pressure level.

The line pressure solenoid 24 is of the ON/DRAIN type and arranged to modulate the level of pilot pressure which is used to control the pressure modifier valve 24. By varying the duty ratio of the signal which is applied to the line pressure solenoid 24 it is possible to control the level of the pressure which is supplied to the pressure regulator valve via conduit 76 and therefore control the level of the line pressure. For example, by controlling the duty ratio to 0 (zero) the level of the modifier pressure which is supplied into conduit 76 can be minimized. Under these conditions, the level of the line pressure is controlled to a minimum level under the influence of the spring 20a. It should be noted however, that under normal circumstance the level of the duty ratio signal is higher than 0.

As schematically indicated in FIG. 1, the control unit 4010 is arranged to output a control signal to the line pressure solenoid 24. During normal non-shifting modes of operation, the duty ratio of the signal is controlled in accordance with the opening degree of the engine throttle valve as sensed by throttle sensor 4020. During shifting, the duty ratio of the line pressure solenoid control signal is varied under the control of a so called "engagement pressure determining means" which is schematically indicated as black box 4082. An example of the manner in which the signal is varied is given in JP-A-62-88856.

The control unit 4010 further includes an arrangement for detecting power off upshift. Viz., an upshift which occurs with the accelerator pedal 4084 released. As shown, this arrangement, which is schematically indicated by black box 80, is responsive to signals produced by an accelerator pedal operated idle switch 4086 and a vehicle speed sensor 4088.

The engagement pressure determining means 4082 responds to the detection of a power off upshift by reading the vehicle speed and deriving the relative rotational speed which exists between the driven and driving members of a friction element or elements prior the engagement thereof. During this derivation the gear to which the shift will be made is used to predict which friction elements will be engaged and thus enable the relative rotation between the driving and driven elements to be calculated for the instant vehicle speed.

The duty ratio of the line pressure control solenoid control signal is determined in accordance with the relative rotational speed derivation.

Figure 5:
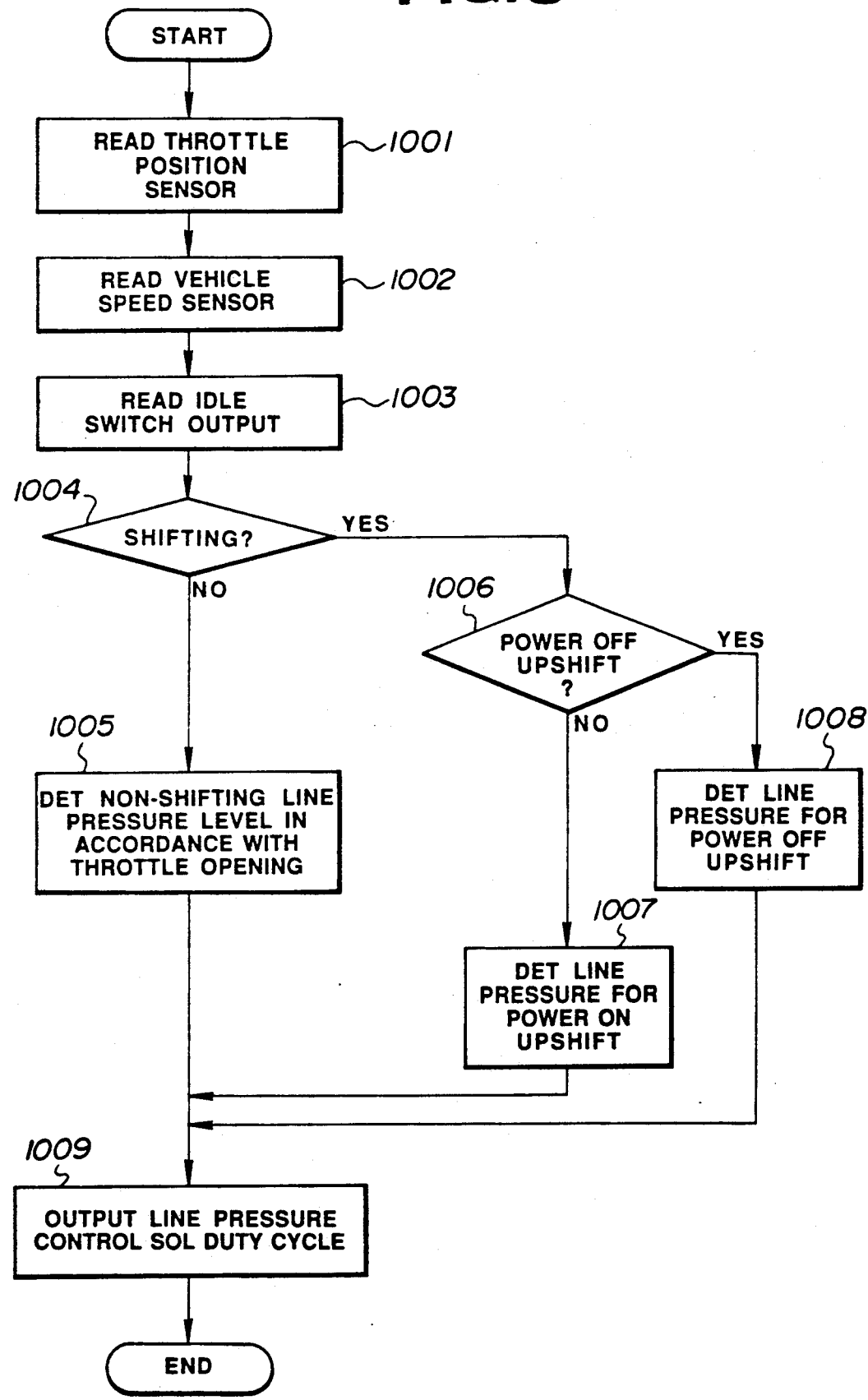
FIG. 5 is a flow chart which depicts the steps which are executed in accordance with the control which characterizes the present invention.

FIG. 5 is a flow chart depicting the steps which characterize the operation of the instant embodiment. As will be appreciated, the first three steps of this routine are such as to read in the engine throttle position, the vehicle speed and the output of the idle switch 4086. At step 1004 it is determined if the transmission is undergoing a shift or not. In the case that transmission is operating under a non. shifting mode, the routine proceeds to step 1005 wherein the level of line pressure (viz., the line pressure solenoid control signal duty ratio) is determined based on the throttle position data.

However, if the transmission is detected as undergoing a shift, the routine proceeds to step 1006 in order to determine if the shift is a power off upshift or not. Depending on the outcome of this enquiry the routine flows to either step 1007 in the case of a negative outcome or to step 1008 in the case a power off upshift is in progress.

In the event the routine flows to step 1007 the level of line pressure is determined in accordance with power on upshifting requirements while in the event that the routine goes to step 1008 the level of line pressure is adjusted for power off conditions. Following either of steps 1005, 1007 and 1008 the routine flows to step 1009 wherein the appropriate duty ratio signal is supplied to the line pressure solenoid 24.

Figure 6:
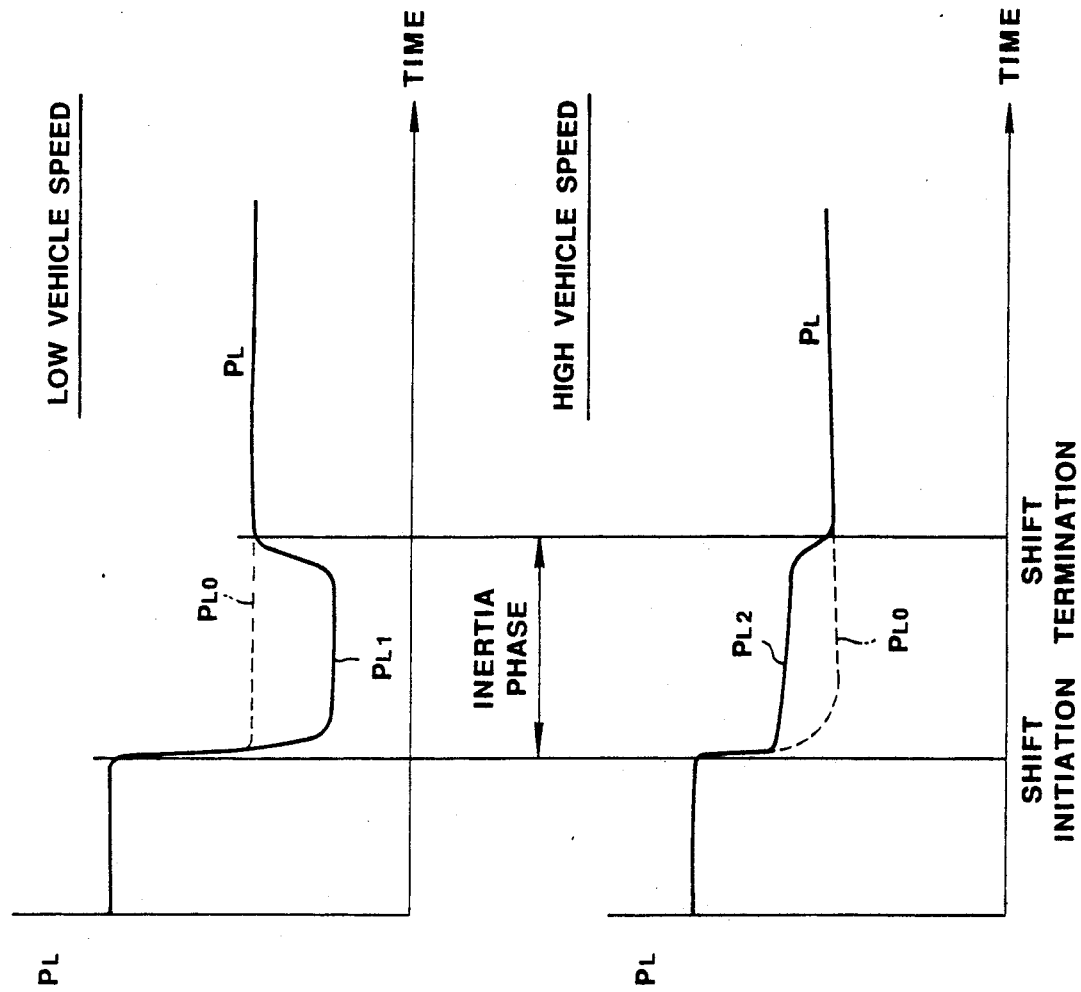
FIGS. 6A an 6B are timing charts showing the line pressure characteristics which are produced under low and high vehicle speed conditions, respectively.

When the routine flows to step 1008, the duty ratio of the line pressure solenoid control signal is controlled so that during the inertia phase (see FIGS. 6(A) and 6(B)), the level of line pressure is markedly reduced. FIG. 6(A) shows the line pressure is produce in accordance with the present invention at low vehicle speed while FIG. 6(B) shows the level which is induced during high vehicle speeds. In these figures the broken line traces denote the level of line pressure which is provided during the inertia phase in accordance with the prior art control techniques.

In this case the above mentioned inertia time is defined between the point in time following the issuance of a shift command signal whereat the transmission input/output shaft rotational speed ratio deviates from that indicative of the gear ratio from which the shift is being made, and the point in time whereat the input/output shaft rotational speed ratio assumes the value of the gear to which the shift is being made. In this case, this data can be obtained by reading the inputs from the vehicle speed sensor 4088 and a transmission input shaft rotational speed sensor 4021. Alternatively, the output of an engine speed sensor 4023 can be used in place of that produced by sensor 4021.

As will be noted, at low vehicle speeds the level of line pressure PL1 which is produced with the present invention is lower than PL0, while at high vehicle speeds the level of line pressure PL2 provided is higher than the PL0.

In summary, the present invention is such that, in the case of low vehicle speed power off upshifts, the level of the line pressure during the inertia phase is reduced to a relatively low level while in the case of a high vehicle speed power off upshift the level of line pressure is increased above that previously used.

In accordance with this control, during low speed as the relative rotation between the driving and driven elements of the friction element undergoing engagement is relatively low, the relatively low line pressure is adequate to induce the required engagement characteristics without producing any shift shock. On the other hand, during high vehicle power off upshifts, as the relative rotation between the components of the friction elements is high, the elevated line pressure level induces engagement which prevents slippage and which provides the required torque transmission characteristics.

By way of example, as shown in FIG. 10, in the case of a 2-3 power off upshift, the band brake B/B is released and the high clutch H/C is engaged. During the engagement of the high clutch H/C the rotational speed difference between the relatively rotatable driving and driven plates which occurs once the inertia phase in entered, is used as the key parameter for determining the required pressure level.

Figure 7:
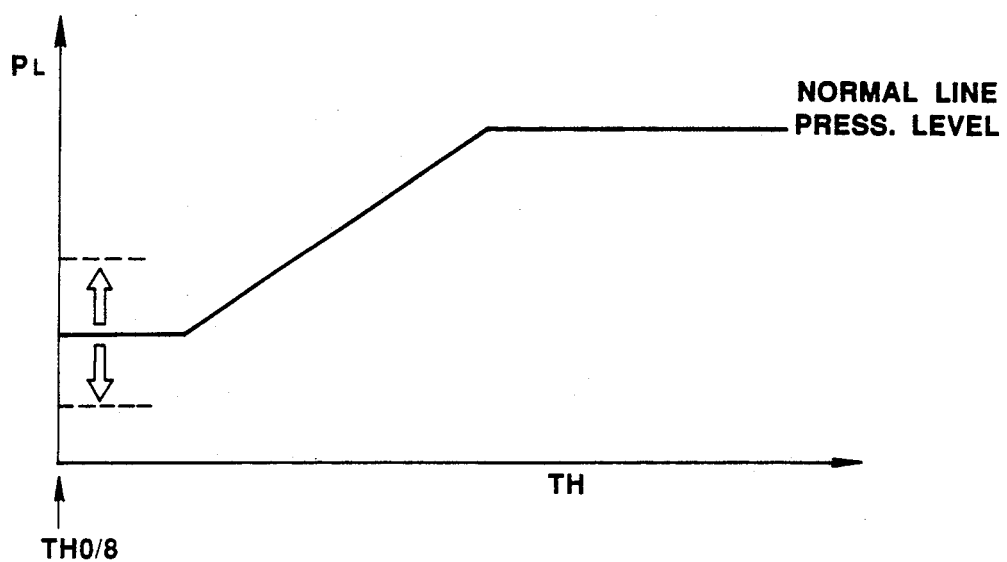
FIG. 7 is a chart which shows in terms of line pressure and throttle opening, the variation which is produced in the line pressure at low throttle settings and which compares this range with the normal line pressure level.

However, even through in FIGS. 6(A) and 6(B) the line pressure characteristics are expressed in terms of time in a manner to define a timing chart, it will be appreciated that, as shown in FIG. 7, the level of line pressure is also variable with the load on the engine (viz., throttle position). As shown in this latter mentioned figure, when the throttle valve opening is 0/8 (accelerator pedal released) the line pressure is rendered variable between the limits indicated by the broken lines.

Figure 8:
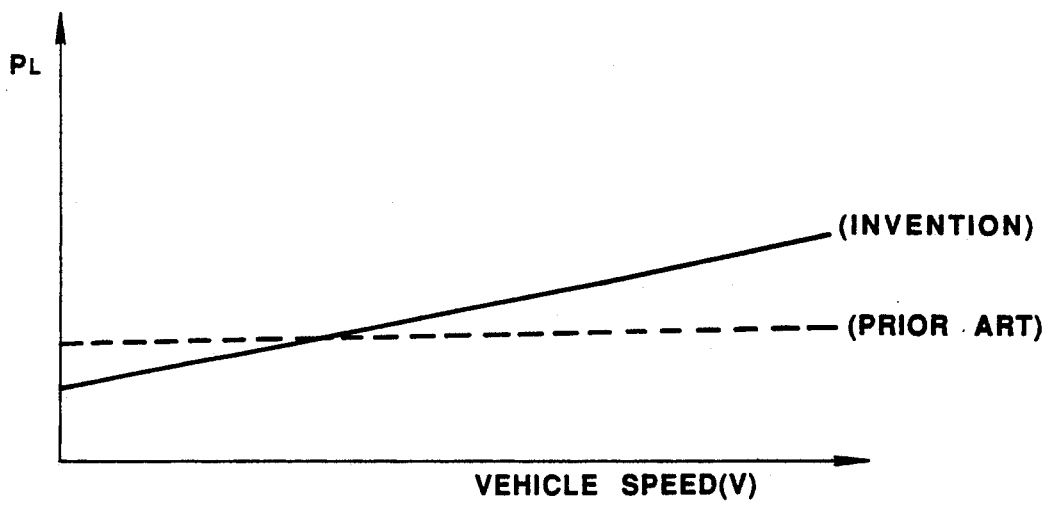
FIG. 8 is a chart which shows in terms of line pressure and vehicle speed, the difference between the line pressure characteristics achieved in accordance with the present invention and those produced by the prior art discussed in the opening paragraphs of the instant invention.
Figure 9:
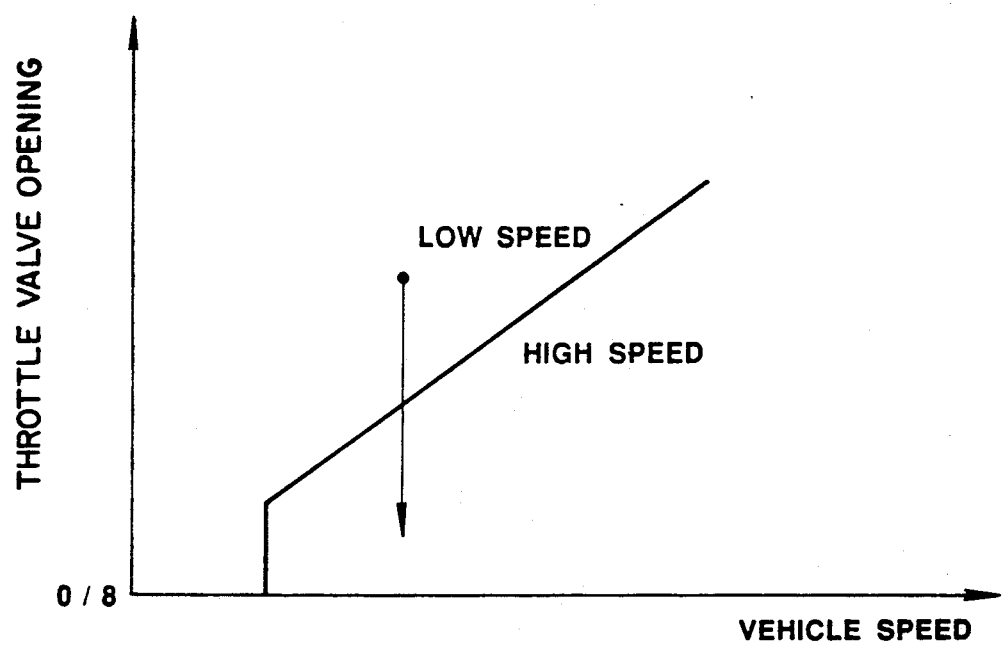
FIG. 9 is a chart which shows the upshift schedule referred to in the opening paragraphs of the instant disclosure.

Further, as will be appreciated from FIG. 8, the effect of the present invention is such that the level of line pressure during power off upshifts, is induced to vary with respect to vehicle speed in the manner indicated by the solid line trace. As will be seen, at low vehicle speeds the level of line pressure is lower than that hitherto used (see chain line trace). As the speed increases the level of line pressure rises to and surpasses the previously used control level.

It will be noted that this line pressure control which characterizes the present invention is only implemented during the inertia phase of a power off upshift. During the other phases of the shift, the level of line pressure is controlled in accordance with the previously proposed schedules.

Additionally, with the instant embodiment, although the use of engine speed only has been given as a parameter for determining the relative rotational speed between the engageable members of the friction element(s), it will be noted that it is within the scope of the present invention to use an engine speed signal, a signal indicative of the rotational speed of the torque converter turbine shaft or the like, either alone or in combination to determined the necessary relative rotational speed data which is critical to the present invention.

What is claimed is:

1. An automatic transmission comprising:
   a source of line pressure;
     a friction element which is engaged during an upshift, said friction element having a driven element and a driving element;
     a shift valve interposed between said source of line pressure and said friction element which controls the supply of line pressure to said friction element;
   means for detecting a power off upshift; and
   line pressure control means for varying the level of line pressure which develops upstream of said shift valve in accordance with the relative rotation which occurs between said driven and driving elements of said friction element during the inertia phase of a power off upshift.

2. A transmission comprising:
   a source of hydraulic line pressure;
   a shift valve which controls the supply of line pressure to a friction element;
   means for detecting when the transmission undergoes a power off minimal load upshift;
   means for detecting an inertia phase of a friction element which becomes engaged during the detected minimal load upshift;
   means for estimating the relative rotational speed which occurs between elements of the friction element which are rotatable relative to one another; and
   means responsive to the detection of the minimal load upshift for varying the level of the hydraulic line pressure which prevails upstream of said shift valve and which is supplied through said shift valve to engage said friction element in accordance with the estimated relative rotational speed which occurs between elements of said friction element which are rotatable relative one another.

3. A method of controlling a transmission having a hydraulically operated friction element, comprising the steps of:
   detecting an inertia phase of a minimal load upshift;
   controlling the supply of line pressure to the friction element using a shift valve;
   adjusting the pressure level of the line pressure which prevails upstream of the shift valve during the inertia phase in accordance with the relative rotational speed which occurs between elements of the friction element.

4. An automotive power train comprising:
   an engine having a throttle valve;
   a throttle valve sensor which senses the position of the throttle valve and issues a signal indicative of the load on the engine;
   a transmission operatively connected with said engine, said transmission including:
     a friction element, said friction element being engaged when the transmission upshifts from a first gear ratio to a second higher gear ratio;
     a source of line pressure;
     a line pressure control solenoid which controls the pressure level of the line pressure which is produced by said source;
     a shift valve interposed between said source and said friction element, a vehicle speed sensor; and a control unit which controls the operation of the line pressure control solenoid, said control circuit being operatively connected with said throttle valve sensor and said vehicle speed sensor and including means for:

detecting when the transmission undergoes an upshift under minimal engine load;

detecting the inertia phase of said friction element;

determining the rotational speed difference between elements of said friction element which are rotatable relative on one another;

controlling the level of line pressure which prevails upstream of said shift valve during the inertia phase of the upshift in accordance with the determined rotational speed difference; and controlling the level of line pressure prevailing upstream of said shift valve during the phases of the shift which precede and follow the inertia phase according to a predetermined schedule.

5. A transmission comprising:

a plurality of friction element, each of said friction elements having a driven element and a driving element;

a plurality of shift valves associated with said plurality of friction elements;

a single source of variable level line pressure which supplies line pressure to said plurality of shift valves;

means for detecting a power off upshift;

line pressure control means for controlling the level of line pressure which develops upstream of said plurality of shift valves in accordance with the relative rotation which occurs between said driven and driving elements of said friction elements during the inertia phase of a friction element which is engaged during the power off upshift.

* * * * *